(12) United States Patent
Anbuselvan (10) Patent No.: US 8,332,654 B2
(45) Date of Patent: Dec. 11, 2012

(54) SECURE FRAMEWORK FOR INVOKING SERVER-SIDE APIS USING AJAX

(75) Inventor: Ananthalakshmi Anbuselvan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 775 days.

(21) Appl. No.: 12/330,008

(22) Filed: Dec. 8, 2008

(65) Prior Publication Data

US 2010/0146291 A1    Jun. 10, 2010

(51) Int. Cl.
G06F 11/30    (2006.01)
G06F 9/44     (2006.01)

(52) U.S. Cl. .................. 713/189; 719/315; 707/781
(58) Field of Classification Search .............. 713/189; 719/315; 707/781
See application file for complete search history.

(56) References Cited

U.S. PATENT DOCUMENTS

| | | |
|---|---|---|
| 5,850,518 A | 12/1998 | Northrup |
| 6,397,254 B1 | 5/2002 | Northrup |
| 6,421,705 B1 | 7/2002 | Northrup |
| 6,546,413 B1 | 4/2003 | Northrup |
| 6,641,746 B2 | 11/2003 | Houge et al. |
| 6,671,713 B2 | 12/2003 | Northrup |
| 6,779,000 B1 | 8/2004 | Northrup |
| 6,807,636 B2 | 10/2004 | Hartman et al. |
| 6,922,705 B1 | 7/2005 | Northrup |
| 6,947,992 B1 | 9/2005 | Shachor |
| 7,062,749 B2 | 6/2006 | Cyr et al. |
| 7,188,158 B1 | 3/2007 | Stanton et al. |
| 7,343,360 B1 | 3/2008 | Ristanovic et al. |
| 7,535,927 B1 | 5/2009 | Northrup |
| 7,536,606 B2 | 5/2009 | Andrews et al. |
| 7,603,674 B2 | 10/2009 | Cyr et al. |
| 7,774,477 B2 | 8/2010 | Zintel et al. |
| 7,783,782 B2 | 8/2010 | Cromp et al. |
| 7,788,338 B2 | 8/2010 | Savchenko et al. |
| 7,793,340 B2 * | 9/2010 | Kiester et al. .............. 726/4 |
| 7,827,494 B1 | 11/2010 | Hedayatpour et al. |
| 7,853,899 B1 | 12/2010 | Damaschke et al. |
| 7,865,544 B2 * | 1/2011 | Kordun et al. ............ 709/200 |
| 7,895,512 B2 | 2/2011 | Roberts |

(Continued)

OTHER PUBLICATIONS

Curphey et al., "Web Application Security Assessment Tools", IEEE, 2006, pp. 32-41.*

(Continued)

Primary Examiner — William Powers
(74) Attorney, Agent, or Firm — Kilpatrick Townsend & Stockton LLP (57) ABSTRACT

Techniques for securely invoking a server-side API from client-side Web application code using AJAX. In one set of embodiments, a request to invoke a server-side API is received from a client-side component of a Web application, where the request is sent asynchronously using AJAX. One or more security handlers are then invoked to process the request in a manner that mitigates various security attacks. In one embodiment, a security handler is invoked to defend against a plurality of different types of Web application/AJAX security attacks. In another embodiment, authentication and authorization security handlers are invoked to authenticate a user of the Web application that originated the request and determine whether the user is authorized to call the server-side API. In yet another embodiment, configuration is implemented at the data storage tier to enforce user-access and data security on data that is retrieved/stored as a result of invoking the server-side API.

22 Claims, 4 Drawing Sheets

U.S. PATENT DOCUMENTS

| | | | |
|---|---|---|---|
| 7,933,946 B2 * | 4/2011 | Livshits et al. | 709/200 |
| 7,984,424 B2 | 7/2011 | Dengler et al. | |
| 2002/0103660 A1 | 8/2002 | Cramon et al. | |
| 2002/0129060 A1 | 9/2002 | Rollins et al. | |
| 2002/0147757 A1 | 10/2002 | Day et al. | |
| 2002/0188613 A1 | 12/2002 | Chakraborty et al. | |
| 2003/0005117 A1 | 1/2003 | Kang et al. | |
| 2003/0025732 A1 | 2/2003 | Prichard | |
| 2003/0034989 A1 | 2/2003 | Kondo | |
| 2003/0172127 A1 | 9/2003 | Northrup et al. | |
| 2003/0172168 A1 | 9/2003 | Mak et al. | |
| 2003/0172193 A1 | 9/2003 | Olsen | |
| 2003/0204518 A1 | 10/2003 | Lang et al. | |
| 2003/0204645 A1 | 10/2003 | Sharma et al. | |
| 2003/0233631 A1 | 12/2003 | Curry et al. | |
| 2004/0046787 A1 | 3/2004 | Henry et al. | |
| 2004/0046789 A1 | 3/2004 | Inanoria | |
| 2004/0073565 A1 | 4/2004 | Kaufman et al. | |
| 2004/0078424 A1 | 4/2004 | Yairi et al. | |
| 2004/0111533 A1 | 6/2004 | Beisiegel et al. | |
| 2004/0111673 A1 | 6/2004 | Bowman et al. | |
| 2004/0148588 A1 | 7/2004 | Sadiq | |
| 2004/0181534 A1 | 9/2004 | Mortensen et al. | |
| 2004/0205117 A1 | 10/2004 | Hertling et al. | |
| 2004/0205765 A1 | 10/2004 | Beringer et al. | |
| 2004/0230639 A1 | 11/2004 | Soluk et al. | |
| 2005/0044197 A1 | 2/2005 | Lai | |
| 2005/0193061 A1 | 9/2005 | Schmidt et al. | |
| 2005/0251788 A1 | 11/2005 | Henke et al. | |
| 2005/0273772 A1 | 12/2005 | Matsakis et al. | |
| 2006/0010163 A1 | 1/2006 | Herzog et al. | |
| 2006/0015847 A1 | 1/2006 | Carroll, Jr. | |
| 2006/0031750 A1 | 2/2006 | Waldorf et al. | |
| 2006/0036463 A1 | 2/2006 | Patrick et al. | |
| 2006/0080117 A1 | 4/2006 | Carr et al. | |
| 2006/0101038 A1 | 5/2006 | Gabriel et al. | |
| 2006/0106626 A1 | 5/2006 | Jeng et al. | |
| 2006/0130047 A1 | 6/2006 | Burugapalli | |
| 2006/0136832 A1 | 6/2006 | Keller et al. | |
| 2006/0143229 A1 | 6/2006 | Bou-Ghannam et al. | |
| 2006/0150156 A1 | 7/2006 | Cyr et al. | |
| 2006/0165105 A1 | 7/2006 | Shenfield et al. | |
| 2006/0168132 A1 | 7/2006 | Bunter et al. | |
| 2006/0168355 A1 | 7/2006 | Shenfield et al. | |
| 2006/0184866 A1 | 8/2006 | Rees | |
| 2006/0206858 A1 * | 9/2006 | Becker et al. | 717/104 |
| 2006/0235733 A1 | 10/2006 | Marks | |
| 2006/0235986 A1 | 10/2006 | Kim | |
| 2006/0253490 A1 | 11/2006 | Krishna et al. | |
| 2006/0294474 A1 | 12/2006 | Taylor et al. | |
| 2006/0294506 A1 | 12/2006 | Dengler et al. | |
| 2007/0016429 A1 | 1/2007 | Bournas et al. | |
| 2007/0055936 A1 | 3/2007 | Dhanjal et al. | |
| 2007/0113191 A1 | 5/2007 | Keller et al. | |
| 2007/0130205 A1 | 6/2007 | Dengler et al. | |
| 2007/0157078 A1 | 7/2007 | Anderson | |
| 2007/0169199 A1 * | 7/2007 | Quinnell et al. | 726/25 |
| 2007/0174763 A1 | 7/2007 | Chang et al. | |
| 2007/0174822 A1 | 7/2007 | Moser et al. | |
| 2007/0203956 A1 | 8/2007 | Anderson et al. | |
| 2007/0277095 A1 | 11/2007 | Ukigawa | |
| 2007/0282885 A1 | 12/2007 | Baude et al. | |
| 2007/0294586 A1 | 12/2007 | Parvathy et al. | |
| 2008/0004887 A1 | 1/2008 | Brunswig et al. | |
| 2008/0028302 A1 | 1/2008 | Meschkat | |
| 2008/0065675 A1 | 3/2008 | Bozich et al. | |
| 2008/0077848 A1 | 3/2008 | Roberts | |
| 2008/0083012 A1 * | 4/2008 | Yu et al. | 726/1 |
| 2008/0104617 A1 | 5/2008 | Apacible et al. | |
| 2008/0120557 A1 | 5/2008 | Offenhartz et al. | |
| 2008/0126396 A1 | 5/2008 | Gagnon | |
| 2008/0127124 A1 | 5/2008 | Gilfix et al. | |
| 2008/0162304 A1 | 7/2008 | Ourega | |
| 2008/0163164 A1 | 7/2008 | Chowdhary et al. | |
| 2008/0183479 A1 | 7/2008 | Iwashita et al. | |
| 2008/0183744 A1 | 7/2008 | Adendorff et al. | |
| 2008/0184201 A1 | 7/2008 | Burns et al. | |
| 2008/0243901 A1 | 10/2008 | Super et al. | |
| 2008/0250313 A1 | 10/2008 | Kamdar et al. | |
| 2008/0275844 A1 * | 11/2008 | Buzsaki et al. | 707/3 |
| 2008/0276218 A1 | 11/2008 | Taylor et al. | |
| 2008/0276260 A1 | 11/2008 | Garlick et al. | |
| 2008/0295109 A1 | 11/2008 | Huang et al. | |
| 2008/0313648 A1 * | 12/2008 | Wang et al. | 719/315 |
| 2009/0031280 A1 | 1/2009 | Koehler | |
| 2009/0083297 A1 | 3/2009 | Pohl et al. | |
| 2009/0106494 A1 | 4/2009 | Knebel | |
| 2009/0144716 A1 | 6/2009 | Felts | |
| 2009/0144729 A1 | 6/2009 | Guizar | |
| 2009/0150565 A1 | 6/2009 | Crossner et al. | |
| 2009/0157859 A1 | 6/2009 | Morris | |
| 2009/0158237 A1 | 6/2009 | Zhang et al. | |
| 2009/0204567 A1 | 8/2009 | Barrow | |
| 2009/0204629 A1 | 8/2009 | Barrow | |
| 2009/0204884 A1 | 8/2009 | Barrow et al. | |
| 2009/0204943 A1 | 8/2009 | Konduri | |
| 2009/0205013 A1 | 8/2009 | Lowes | |
| 2009/0217153 A1 | 8/2009 | Oshima et al. | |
| 2009/0259993 A1 | 10/2009 | Konduri et al. | |
| 2009/0292797 A1 | 11/2009 | Cromp et al. | |
| 2009/0313256 A1 | 12/2009 | Konduri et al. | |
| 2010/0057482 A1 | 3/2010 | Radhakrishnan et al. | |
| 2010/0057836 A1 | 3/2010 | Anbuselvan | |
| 2010/0070553 A1 | 3/2010 | Addala et al. | |
| 2010/0070973 A1 | 3/2010 | Addala et al. | |
| 2010/0082556 A1 | 4/2010 | Srinivasan et al. | |
| 2010/0132009 A1 * | 5/2010 | Khemani et al. | 726/1 |
| 2010/0313038 A1 | 12/2010 | Bradley et al. | |
| 2011/0023071 A1 | 1/2011 | Li et al. | |
| 2011/0119649 A1 | 5/2011 | Kand et al. | |
| 2011/0119651 A1 | 5/2011 | Utschig-Utschig et al. | |

OTHER PUBLICATIONS

"Oracle Application Framework", Oracle, Dec. 2006, pp. 1-242.*
DiPaola et al., "Subverting Ajax", Dec. 2006, 23rd CCC Conference, pp. 1-8.*
"Direct Web Remoting, Security," 4 pages downloaded http://directwebremoting.org/dwr/security on Oct. 6, 2008.
"Google Web Toolkit, Product Overview," 3 pages downloaded http://code.google.com/webtoolkit/overview.html on Oct. 6, 2008.
"Direct Web Remoting, Safari, GET and Request Forgery," 1 page downloaded from http://directwebremoting.org/dwr/security/allowGetForSafariButMakeForgeryEasier on Oct. 6, 2008.
"AJAX & Security: Vulnerability in DWR Security Logic Identified Can Potentially be exploited to launch DoS attacks and break into back-end servers," AjaxWorld™ Magazine, pp. 1-4 downloaded from http://ajax.sys-con.com/node/319868 on Oct. 6, 2008.
"Direct Web Remoting, About DWR's Javascript Security," 4 pages downloaded from http://directwebremoting.org/dwr/security/script-tag-protection on Oct. 6, 2008.
"Direct Web Remoting, DWR: Easy AJAX for JAVA," 2 pages downloaded from http://directwebremoting.org/dwr/overview/dwr on Oct. 6, 2008.
"Direct Web Remoting, DWR version 2—New and Noteworthy," 4 pages downloaded from http://directwebremoting.org/dwr/changelog/dwr20 on Dec. 5, 2008.
U.S. Appl. No. 13/360,127, Jan. 27, 2012, Krishnamurthy.
Dynamic Structure in ADF UIX Pages, from Oracle ADF UIX Developer's Guide, Copyright 2001, 2004 Oracle, downloaded on Mar. 7, 2012 from http://download.oracle.com/otn_hosted_doc/jdeveloper/1012/uixhelp/uixdevguide/dynamic.html 11 pages.
"Client-Server Modernization—From Oracle® Forms to Java," VGO Software Products, Copyright 2009 Vgo Software Inc., printed on Aug. 28, 2009, downloaded from URL: http://www.vgosoftware.com/products/evo/index.php 2 pages.
"Vgo Software First to Convert Oracle Forms to Oracle ADF V11"; VGO News, Sep. 16, 2008, downloaded on Aug. 28, 2009 from URL: http://www.vgosoftware.com/about/news/view_article.php?new id=35 2 pages.
"Oracle Forms to Java Modernization" printed on Aug. 28, 2009, at URL: http://www.vgosoftware.com/products/evo/walkthrough.php, VGO Software Information printed 5 pages.

CipherSoft Inc, "Exodus-Main Features Benefits" Products, at URL: http://www.ciphersoftinc.com/products/expdus-features-benefits.html printed on Aug. 28, 2009; 3 pages.

CipherSoft Inc, "Exodus™ Products," printed on Aug. 28, 2009, at URL: http://www.ciphersoftinc.com/products/migration-products-overview.html 3 pages.

Shepherd, et al., " Oracle SCA—The Power of the Composite," An Oracle White Paper, Aug. 2009, Oracle, pp. 1-19, 19 pages.

Chappell, "Introducing SCA," David Chappell & Associates, Jul. 2007, pp. 1-22, 22 pages.

Chapman, et al., "SCA Service Component Architecture—Client and Implementation Model Specification for WS-BPEL," Mar. 21, 2007, SCA version 1.00, 15 pages, BEA Systems, Inc.

Beisiegel, et al., "SCA Service Component Architecture—Assembly Model Specification," Mar. 15, 2007, SCA version 1.00, 91 pages, BEA Systems, Inc.

"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_fac.html?template=. . . , 3 pages.

Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15, 15 pages.

Smith, Portals: Toward an Application Framework for Interoperability,: Communications of the ACM, Oct. 2004, vol. 47, No. 10, pp. 93-97, 5 pages.

Phanouriou, "UIML: A Device-Independent User Interface Markup Language," Doctoral Dissertation, Virginia Polytechnic Institute and State University, Sep. 26, 2000, 172 pages.

"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . . , 6 pages.

Hildebrandt, G., "Web-based Document Management", Apr. 2001, 22 pages.

Shang-Pin Ma, "Discovery-Based Service Composition, " National Central University, Doctoral Dissertation. Jan. 2007, 109 pages.

Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.

Altenhofen et al., "ASMs in Service Oriented Architectures", Journal of Universal Computer Science, vol. 14, No. 12, 2008, 25 pages.

Box et al., "Web Services Addressing (WS-Addressing)" Aug. 10, 2004, 23 pages, http://www.w3.org/Submission/ws-addressing/#_Toc77464317 printed on Aug. 18, 2009, 23 pages.

Carey, "Making BPEL Processes Dynamic" Oracle Technology Network, 8 pages, printed on Aug. 18, 2009, 8 pages.

Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypool2000OptimizingPerformanceofSchemaEvolutionSequences.pdf pp. 114-127, 14 pages.

Hohpe et al., "Messaging Systems" Enterprise Integration Patterns 2004, pp. 57-97, Chapter 3, Pearson Education, Inc, Boston, Massachusetts, 45 pages.

Nagappan et al., "XML Processing and Data Binding with Java APIs" in: Developing Java Web Services: Architecting and Developing Secure Web Services Using Java [online], 2003 [retrieved Feb. 7, 2012], retrieved from Internet: http://java.sun.com/developer/Books/j2ee/devjws/ pp. 313-399, 89 pages.

Steinberg, "Data Binding with JAXB" [online], 2003 [retrieved Feb. 7, 2012], retrieved from Internet: https://www6.software.ibm.com/developerworks/education/x-jabx/x-jaxb-a4.pdf pp. 1-34, 34 pages.

Non-Final Office Action for U.S. Appl. No. 12/029,600 mailed on Apr. 27, 2011, 29 pages.

Non-Final Office Action for U.S. Appl. No. 12/029,605 mailed on Jul. 20, 2011, 12 pages.

Non-Final Office Action for U.S. Appl. No. 12/029,605 mailed on May 12, 2010, 10 pages.

Final Office Action for U.S. Appl. No. 12/029,605 mailed on Sep. 28, 2010, 13 pages.

Non-Final Office Action for U.S. Appl. No. 12/029,609 mailed on May 26, 2010, 14 pages.

Final Office Action for U.S. Appl. No. 12/029,609 mailed on Oct. 13, 2010, 13 pages.

Non-Final Office Action for U.S. Appl. No. 12/203,816 mailed on Sep. 2, 2010, 16 pages.

Final Office Action for U.S. Appl. No. 12/203,816 mailed on Jan. 20, 2011, 23 pages.

Non-Final Office Action for U.S. Appl. No. 12/029,724 mailed on Dec. 14, 2010, 21 pages.

Final Office Action for U.S. Appl. No. 12/029,724 mailed on May 5, 2011, 19 pages.

Non-Final Office Action for U.S. Appl. No. 12/138,997 mailed on Jun. 24, 2011, 14 pages.

Non-Final Office Action for U.S. Appl. No. 12/101,420 mailed on Oct. 5, 2011, 18 pages.

Final Office Action for U.S. Appl. No. 12/029,600 mailed on Oct. 19, 2011, 20 pages.

Final Office Action for U.S. Appl. No. 12/029,605 mailed on Nov. 2, 2011, 13 pages.

Final Office Action for U.S. Appl. No. 12/029,609 mailed on Nov. 8, 2011, 13 pages.

Final Office Action for U.S. Appl. No. 12/138,997 mailed on Dec. 5, 2011, 13 pages.

Non-Final Office Action for U.S. Appl. No. 12/487,004 mailed on Sep. 28, 2011, 29 pages.

Non-Final Office Action for U.S. Appl. No. 12/210,657 mailed on Apr. 25, 2011, 21 pages.

Non-Final Office Action for U.S. Appl. No. 12/210,657 mailed on Sep. 30, 2011, 21 pages.

Non-Final Office Action for U.S. Appl. No. 12/212,599 mailed on Dec. 22, 2011, 10 pages.

Non-Final Office Action for U.S. Appl. No. 12/029,615 mailed on Feb. 15, 2012, 27 pages.

Final Office Action for U.S. Appl. No. 12/101,420 mailed on Feb. 24, 2012, 20 pages.

Final Office Action for U.S. Appl. No. 12/487,004 mailed on Mar. 19, 2012, 30 pages.

Final Office Action for U.S. Appl. No. 12/210,657 mailed on Apr. 3, 2012, 23 pages.

Notice of Allowance for U.S. Appl. No. 12/210,657 mailed on Jun. 26, 2012, 6 pages.

Final Office Action for U.S. Appl. No. 12/029,615 mailed on Jul. 31, 2012, 33 pages.

* cited by examiner

SECURE FRAMEWORK FOR INVOKING SERVER-SIDE APIS USING AJAX

BACKGROUND OF THE INVENTION

Embodiments of the present invention relate to Web applications, and more particularly relate to a secure framework for invoking server-side Application Programming Interfaces (APIs) from client-side Web Application code using AJAX (Asynchronous JavaScript and XML).

Java® and JavaScript® are registered trademarks of Oracle and/or its affiliates.

Web applications are typically composed of two code layers: a client-side layer (comprising, e.g., one or more Web pages written in HTML, JavaScript, etc.) that is interpreted in a client Web browser and is responsible for the visual presentation of the Web application to a user, and a server-side layer (comprising, e.g., one or more programs written in Java, JSP, Perl, ASP, etc.) that runs on a Web server and is responsible for executing application functions and generating client-side code. Traditionally, these two layers interact according to a synchronous model. For example, if a particular Web page needs to submit data to server-side code running on a Web server, the client Web browser sends an HTTP request to the Web server and waits for a response. The server-side code then processes the request and returns an HTTP response to the Web browser, which causes the browser to reload the Web page (or load a new page) with the contents of the response.

A problem with this synchronous model of communication is that it requires the client-side Web page to be refreshed each time data is sent between the Web browser and Web server. Although this type of behavior may be acceptable for simple Web applications, it can be problematic for more complex Web applications that send frequent requests to (or receive frequent updates from) a Web server. In these cases, each request/update causes the entire client-side Web page to be redrawn, resulting in an awkward and unintuitive user interface experience.

To address the foregoing, various technologies have been developed in recent years that enable asynchronous communication between a Web browser and Web server. One such technology, known as AJAX (Asynchronous JavaScript and XML), makes use of JavaScript on the client-side to send a request to a Web server and to poll for a response in the background. When a response from the Web server is received, the contents of the response are displayed in the client-side Web page without reloading the entire page. Since the communication between the Web browser and Web server occurs independently of the visual presentation of the Web page to the user, a much more responsive and dynamic user interface experience can be achieved.

AJAX is particularly useful for Web applications that need to invoke server-side functions (e.g., Java APIs) from client-side code (e.g., JavaScript). For example, the "Google Suggest" feature found on www.google.com uses client-side JavaScript to invoke a server-side API when a user enters search terms into a text field. The server-side API returns a list of suggested search terms based on the user-entered terms and the list is displayed in a drop-down list in the text field. In this implementation, AJAX is used to asynchronously invoke the server-side API and dynamically display the list of suggested search terms without having to refresh the client-side Web page. A number of existing Web application frameworks, such as Direct Web Remoting (DWR) and Google Web Toolkit (GWT), enable this type of asynchronous remote procedure call functionality.

However, a significant problem with existing frameworks like DWR and GWT is that they do not adequately address the many different types of security vulnerabilities that are inherent in AJAX-based Web applications. Accordingly, it would be desirable to have a framework for invoking server-side APIs from client-side code using AJAX that provides a comprehensive defense against most, if not all, common security attacks.

BRIEF SUMMARY OF THE INVENTION

Embodiments of the present invention provide techniques for securely invoking a server-side API from client-side Web application code using AJAX. In one set of embodiments, a request to invoke a server-side API is received from a client-side component of a Web application, where the request is sent asynchronously using AJAX. One or more security handlers are then invoked to process the request in a manner that mitigates various security attacks. In one embodiment, a security handler is invoked to mitigate a plurality of different types of Web application and AJAX security attacks, such as Cross Site Scripting (XSS), Cross Site Request Forgery (CSRF), injection attacks, replay attacks, and the like. In another embodiment, authentication and authorization security handlers are invoked to authenticate a user of the Web application that originated the request and to determine whether the user is authorized to call the server-side API. In yet another embodiment, configuration is implemented at the data storage (e.g., database) tier to enforce user-access and data security on data that is retrieved or stored as a result of invoking the server-side API.

According to one embodiment of the present invention, a method for securely invoking a server-side API comprises receiving, from a client-side component of a Web application, a request to invoke an API hosted on a server, where the request is sent asynchronously by the client-side component using AJAX. The method further comprises invoking a security handler configured to process the request in a manner that mitigates a plurality of different types of Web application or AJAX security attacks. Examples of such Web application or AJAX security attacks include Cross Site Scripting, Cross Site Request Forgery, injection attacks, and replay attacks. Examples of injection attacks include SQL injection, PL/SQL injection, XML injection, HTML injection, and JavaScript injection. Once the security handler has been called, the API is invoked on the server and a response comprising output data generated by the API is sent to the client-side component.

In one set of embodiments, the method above is performed by a Java servlet running on the server. Additionally, the client-side component is JavaScript code running on a client Web browser, and the API is a Java API.

In one set of embodiments, the plurality of different types of Web application or AJAX security attacks further include illegal redirects and buffer overflows.

In one set of embodiments, the request received from the client-side component includes an API name, a class name, and one or more parameter values for the API.

In one set of embodiments, processing the request comprises validating the one or more parameter values against a white-list of valid characters or values. In another set of embodiments, processing the request comprises escaping code tags in the one or more parameter values. In yet another set of embodiments, processing the request comprises determining whether the one or more parameter values are signed using a context signature.

In one set of embodiments, the method above further comprises invoking an authentication security handler configured to authenticate a user of the Web application that originated the request, and invoking an authorization security handler configured to determine whether the user is authorized to invoke the API. In a particular embodiment, the Web application is built using the Oracle Applications (OA) Framework, and the authentication and authorization security handlers rely on security data specific to the OA Framework.

In one set of embodiments, the API is configured to query one or more database tables, and the results of the query are automatically filtered based on an identity of a user that originated the request and user-access permissions defined for the one or more database tables. In another set of embodiments, the API is configured to store data into one or more database tables, and the data is automatically encrypted prior to storage.

In one set of embodiments, a configuration file is maintained at the server including a list of server-side APIs and associated invocation permissions, and the method above further comprises determining, based on the list, whether the API can be invoked in response to the request.

According to another embodiment of the present invention, a server system is provided. The server system comprises a storage component configured to store code for an Application Programming Interface (API) and a processing component in communication with the storage component. The processing component is configured to receive, from a client-side component of a Web application, a request to invoke the API, where the request is sent asynchronously by the client-side component using AJAX. The processing component is further configured to invoke a security handler adapted to process the request in a manner that mitigates a plurality of different types of Web application or AJAX security attacks. Examples of such Web application or AJAX security attacks include Cross Site Scripting (XSS), Cross Site Request Forgery (CSRF), injection attacks, and replay attacks. Examples of injection attacks include SQL injection, PL/SQL injection, XML injection, HTML injection, and JavaScript injection. Once the security handler has been called, the processing component is configured to invoke the API and send a response comprising output data generated by the API to the client-side component.

According to another embodiment of the present invention, a machine-readable medium for a computer system is provided. The machine-readable medium has stored thereon program code for securely invoking a server-side Application Programming Interface (API), where the program code comprises code for receiving, from a client-side component of a Web application, a request to invoke an API hosted on a server, the request being sent asynchronously by the client-side component using AJAX. The program code further comprises code for invoking a security handler configured to process the request in a manner that mitigates a plurality of different types of Web application or AJAX security attacks. Examples of such Web application or AJAX security attacks include Cross Site Scripting (XSS), Cross Site Request Forgery (CSRF), injection attacks, and replay attacks. Examples of injection attacks include SQL injection, PL/SQL injection, XML injection, HTML injection, and JavaScript injection. The program code further comprises code for invoking the API on the server, and code for sending a response comprising output data generated by the API to the client-side component.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for securely invoking server-side APIs (such as Java APIs) from client-side Web application code (such as JavaScript) using AJAX. In one set of embodiments, the techniques described herein may be used in the enterprise software context to provide a standardized and secure mechanism for invoking server-side APIs in Web-based enterprise applications. In these embodiments, the techniques of the present invention may interface with (and take advantage of) security functions that are already implemented in existing enterprise application frameworks (such as the Oracle Applications Framework). In other embodiments, the techniques described herein may be used in a more general context to facilitate the secure invocation of server-side APIs from client-side code in any type of Web-based application.

Figure 1:
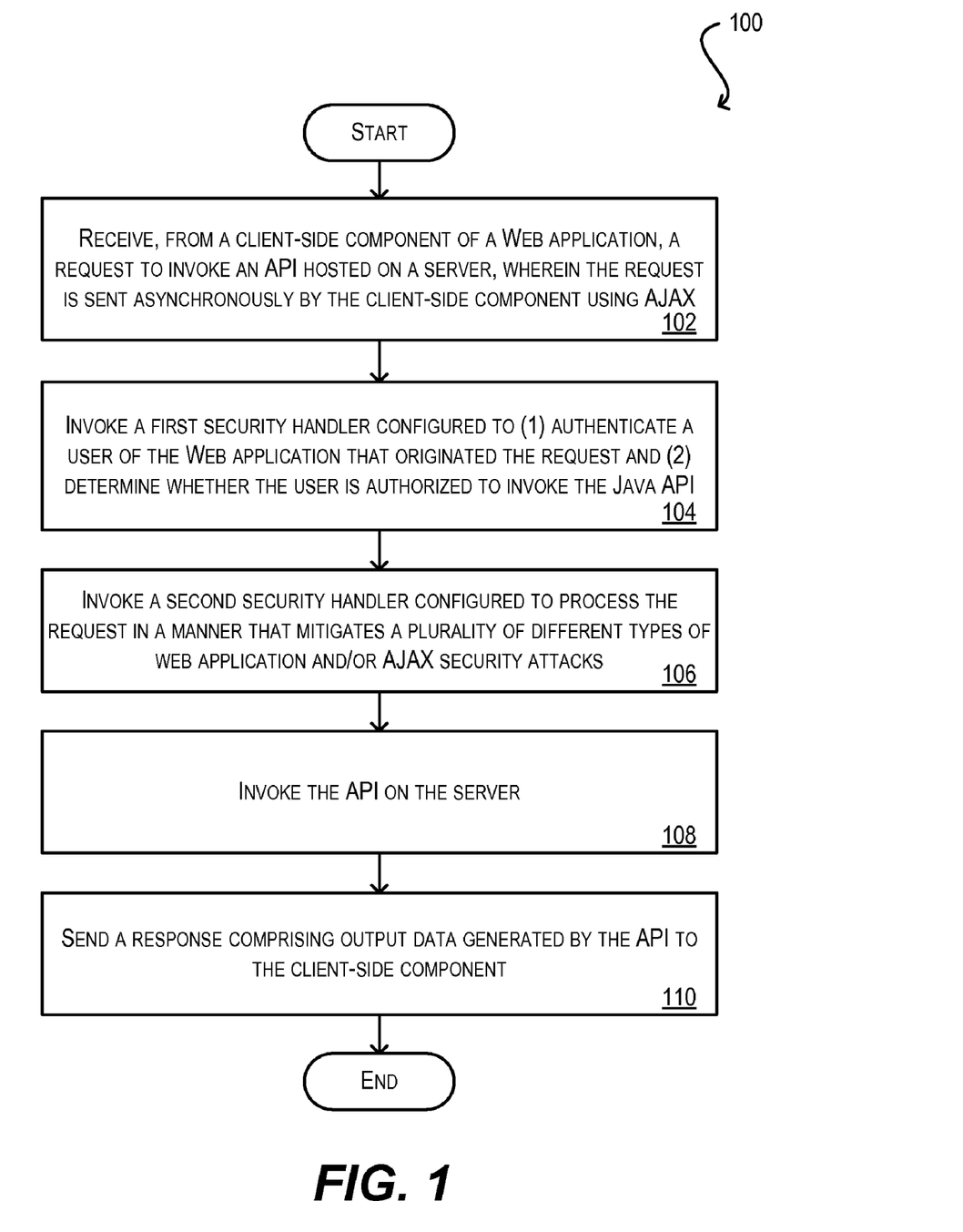
FIG. 1 is a flowchart illustrating steps performed in securely invoking a server-side API in accordance with an embodiment of the present invention.

FIG. 1 is a flowchart 100 illustrating the steps performed in securely invoking a server-side API of a Web application in accordance with an embodiment of the present invention. In various embodiments, the processing of flowchart 100 may be implemented in software, hardware, or combinations thereof. In one embodiment, the processing of flowchart 100 is performed by a Java servlet running on a Web server, such as servlet 208 of FIG. 2. In other embodiments, the processing of flowchart 100 may be performed by any type of server-side component in communication with a client-side component of a Web application. One of ordinary skill in the art would recognize many variations, modifications, and alternatives.

At step 102, a request to invoke an API hosted on a server is received from a client-side component of a Web application, where the request is sent asynchronously using AJAX. Typically, the client-side component will be JavaScript code running in a client Web browser, and the request will be an XMLHttpRequest object. The technical details for asynchronously submitting an XMLHttpRequest from JavaScript using AJAX is well-known in the art, and thus is not discussed in detail here.

In one set of embodiments, the API hosted on the server is a Java API. In these embodiments, the request may include, inter alia, a name of the API, a Java class of the API, and one or more input parameter values. The server-side API may be also be implemented in any one of a number of other programming languages, such as C++, Perl, and the like.

Once the request has been received, a first security handler is invoked, where the first security handler is configured to perform authentication and authorization functions with respect to the request (step 104). For example, in one embodiment, the first security handler is configured to authenticate a user of the Web application that originated the request. In another embodiment, the first security handler is configured to determine whether the user is authorized to invoke the API. Although the term "first security handler" implies a single security handler, it should be appreciated that the authentication and authorization functions attributed to the first security handler may be carried out by separate handlers/APIs.

In some embodiments, the Web application described in flowchart 100 may be built using an existing application framework, and may be designed to make use of standard security functions and metadata that are specific to that framework. For example, applications built using the Oracle Applications Framework are designed to store user identity, role, and responsibility information in an "FND" session context object at user login, which can then be validated against specific functions or pages using standard "FND" APIs. In these cases, the first security handler of step 104 may be configured to leverage these standard APIs (rather than relying on custom code) to carry out authentication and authorization.

By leveraging existing authentication/authorization mechanisms, embodiments of the present invention can be easily made to interoperate with a variety of existing application frameworks. In addition, since these existing mechanisms are typically well-tested and address common authentication/authorization-related vulnerabilities (e.g., password management, session state management, URL access, etc.), the overall security of the system is improved.

If the first security handler indicates that authentication and authorization are successful, a second security handler is invoked, where the second security handler is configured to process the request in a manner that mitigates a plurality of different types of Web application and AJAX security attacks (step 106). Examples of such attacks include Cross Site Scripting (XSS), Cross Site Request Forgery (CSRF), injection attacks (such as SQL, PL/SQL, XML, HTML, CSS, JSON, and JavaScript injection), replay attacks, illegal redirects, buffer overflows, and the like. Like the first security handler of step 104, the processing attributed to the second security handler may be carried out by a single handler or multiple handlers/APIs.

The second security handler is significant for at least two reasons. First, since the request received at step 102 is intended to invoke server-side code from a client, it is important to ensure that the request is not used as an attack vector to gain access to privileged code/data or otherwise compromise the server system. Second, since the request is received asynchronously via AJAX (and thus may not be readily observable from the visual presentation of the client-side Web page), it is difficult to identify and test for security vulnerabilities that may be exploited by the request. Accordingly, the second security handler of step 106 is designed to provide a comprehensive defense against most, if not all, common Web application/AJAX security attacks.

For example, in one embodiment, the second security handler is configured to validate any input parameter values included in the request against a "white-list" of known, valid characters or values. This check prevents the server-side API from being called with non-standard parameters, and thus prevents XSS and certain types of back-end injection attacks (e.g., SQL injection, PL/SQL injection, XML injection, etc.).

In another embodiment, the second security handler is configured to escape code tags (e.g., HTML tags, JavaScript tags, etc.) in any input parameter values. This measure avoids certain types of front-end injection attacks, such as HTML and JavaScript injection.

In yet another embodiment, the second security handler is configured to determine whether static parameter values (e.g., poplist values, LOV values, etc.) in the request are signed using a context (e.g., session-based) signature. This ensures that parameters or other data originating from the server are not tampered with, and thus provides a further defense against XSS and injection attacks. This technique may also be used to verify any request that changes the state of the server (e.g., POST requests), thereby preventing CSRF attacks.

Once the request has been processed by the second security handler in step 106, the API is invoked on the server based on the data (e.g., API name, input parameter values, etc.) in the request (step 108). In many cases, this invocation will result in one or more calls to a data storage (e.g., database) tier to store data received from the client-side component and/or retrieve data for transmittal to the client-side component. In these scenarios, the data storage tier may be configured to provide an additional level of security by enforcing user-access security and data security with respect to this stored/retrieved data.

For example, to enforce user-access security, the data storage tier may be configured to maintain user access policies for one or more database tables, where the user access policies control what rows or columns of the tables a particular user has access to. When the server-side API subsequently queries a database table, the results of the query may be automatically filtered at the data storage level based on the identity of the user that originated the invocation request and the user access policy for the table. In one set of embodiments, this functionality may be implemented using Virtual Private Database (VPD) technology available in Oracle Database 11g.

To enforce data security, the data storage tier may be configured to automatically encrypt sensitive data (such as Personally Identifiable Information (PII)) in the request prior to storing it, and to automatically obfuscate sensitive data upon retrieval so that is it not transmitted in plaintext format to the client-side component. In various embodiments, this functionality may be implemented using different mechanisms, such as the Transparent Data Encryption (TDE) technology included in Oracle Database 10g or the dbms_encrypt package.

Once the server-side API has been invoked and completed execution, a response comprising output data generated by the server-side API is sent to the client-side component (step 110). Since the initial request was sent using AJAX, the client-side component will generally process the response using an asynchronous callback function. The contents of the response are then be presented to the end-user.

In some embodiments, the server-side component (e.g., servlet) performing the steps of flowchart 100 may implement additional security safeguards. For example, in one embodiment, the server-side component may implement a secure error reporting/logging mechanism to avoid information leakage through improper error handling. Thus, if any of the steps of flowchart 100 encounter an unexpected error prior to completion, a generic error message (rather than, for example, a stack trace containing sensitive information) will be returned.

In another embodiment, the server-side component may maintain a configuration file that identifies which server-side APIs should (and/or should not) be invocable from the client-side component via AJAX. For example, the configuration file may include a list of API names and associated execute permissions (e.g., allow execute, disallow execute). This file may then be referenced at the time a request to invoke a server-side API is received to determine whether to allow the invocation.

It should be appreciated that the specific steps illustrated in FIG. 1 provide a particular method for securely invoking a server-side API according to an embodiment of the present invention. Other sequences of steps may also be performed according to alternative embodiments. For example, the individual steps illustrated in FIG. 1 may include multiple sub-steps that may be performed in various sequences as appropriate to the individual step. Furthermore, additional steps may be added, or existing steps may be removed, depending on the particular application. One of ordinary skill in the art would recognize many variations, modifications, and alternatives.

Figure 2:
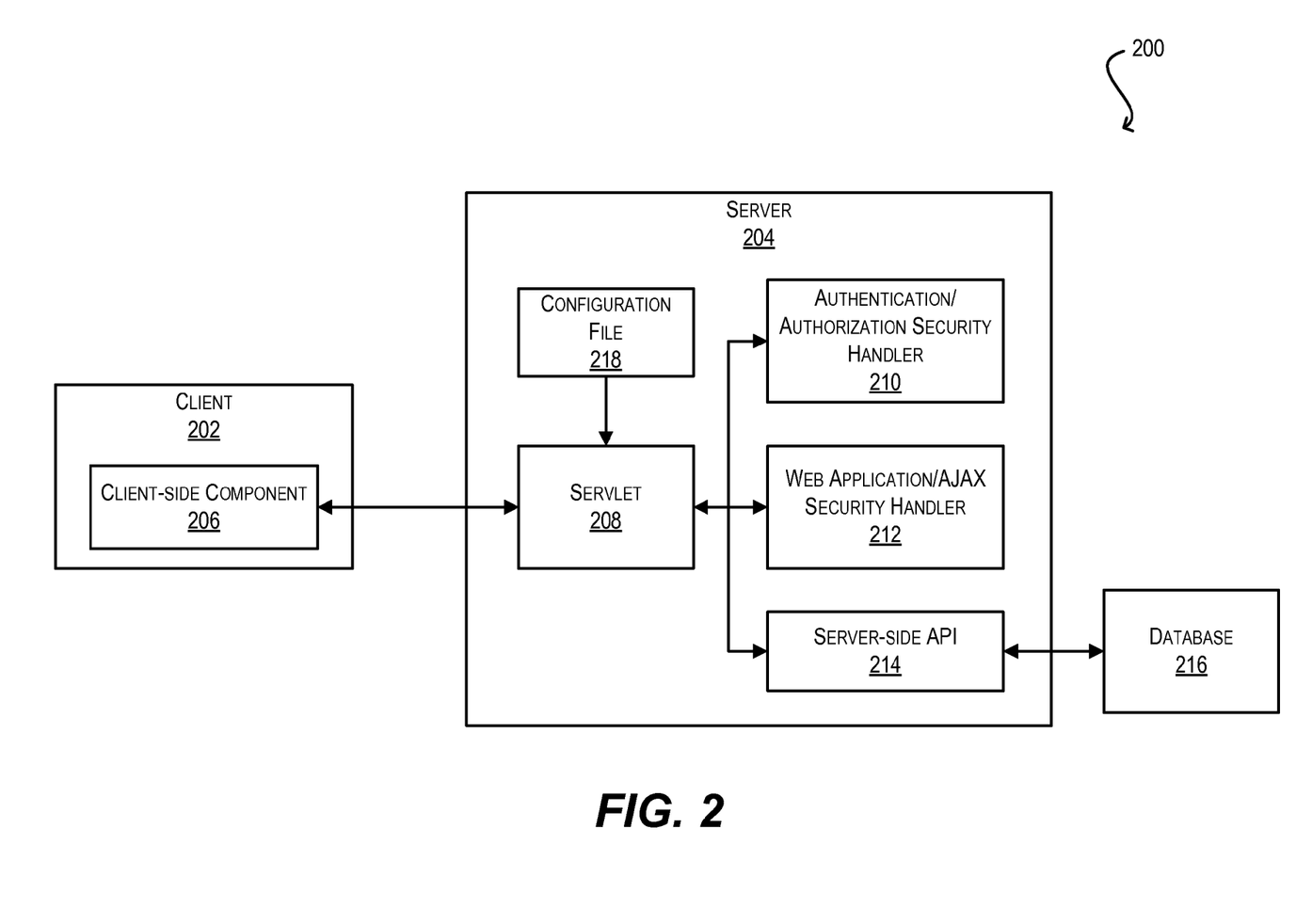
FIG. 2 is a simplified block diagram illustrating functional components of a Web application system in accordance with an embodiment of the present invention.

FIG. 2 is a simplified block diagram illustrating functional components of a Web application system 200 in accordance with an embodiment of the present invention. As shown, system 200 includes a client 202 comprising a client-side component 206 and a server 204 comprising a servlet 208, security handlers 210, 212, and a server-side API 214. In various embodiments, system 200 may be used to facilitate the secure invocation of server-side APIs as described with respect to flowchart 100 of FIG. 1.

For example, in one set of embodiments, servlet 208 is configured to receive a request to invoke a server-side API (such as API 214) from client-side component 206 and to process the request to defend against various security attacks. In an embodiment, this processing includes invoking authentication/authorization security handler 210 to authenticate a user of client 202 that originated the request and to determine whether the user is authorized to call API 214 (i.e., step 104 of FIG. 1). In a further embodiment, this processing includes invoking Web application/AJAX security handler 212 to mitigate a plurality of Web application and AJAX security attacks (i.e., step 106 of FIG. 1). By invoking these handlers, embodiments of the present invention are able to address most, if not all, of the common security vulnerabilities that affect AJAX-based Web applications.

In some embodiments, system 200 may include a data storage component such as database 216 for storing data accessed by server-side API 214. As discussed with respect to FIG. 1, database 216 may implement specific security mechanisms for safeguarding the data stored therein, such as user-access security and data security.

In further embodiments, system 200 may include a configuration file 218 for storing remote execution privileges for various server-side APIs. For example, configuration file 218 may include an entry identifying API 214 and indicating that API 214 can be remotely invoked by client-side component 206. As discussed with respect to FIG. 1, servlet 208 is configured to reference configuration file 218 at the time an invocation request is received from client-side component 206 to determine whether to allow the invocation. Although configuration file 218 is referred to as a "file," one of ordinary skill in the art would recognize that the information contained therein (e.g., API names, permissions) may be stored in any type of logical storage format (e.g., flat file, database entry, etc.). Furthermore, configuration file 218 may be stored in a location local or remote to server 202.

Figure 3:
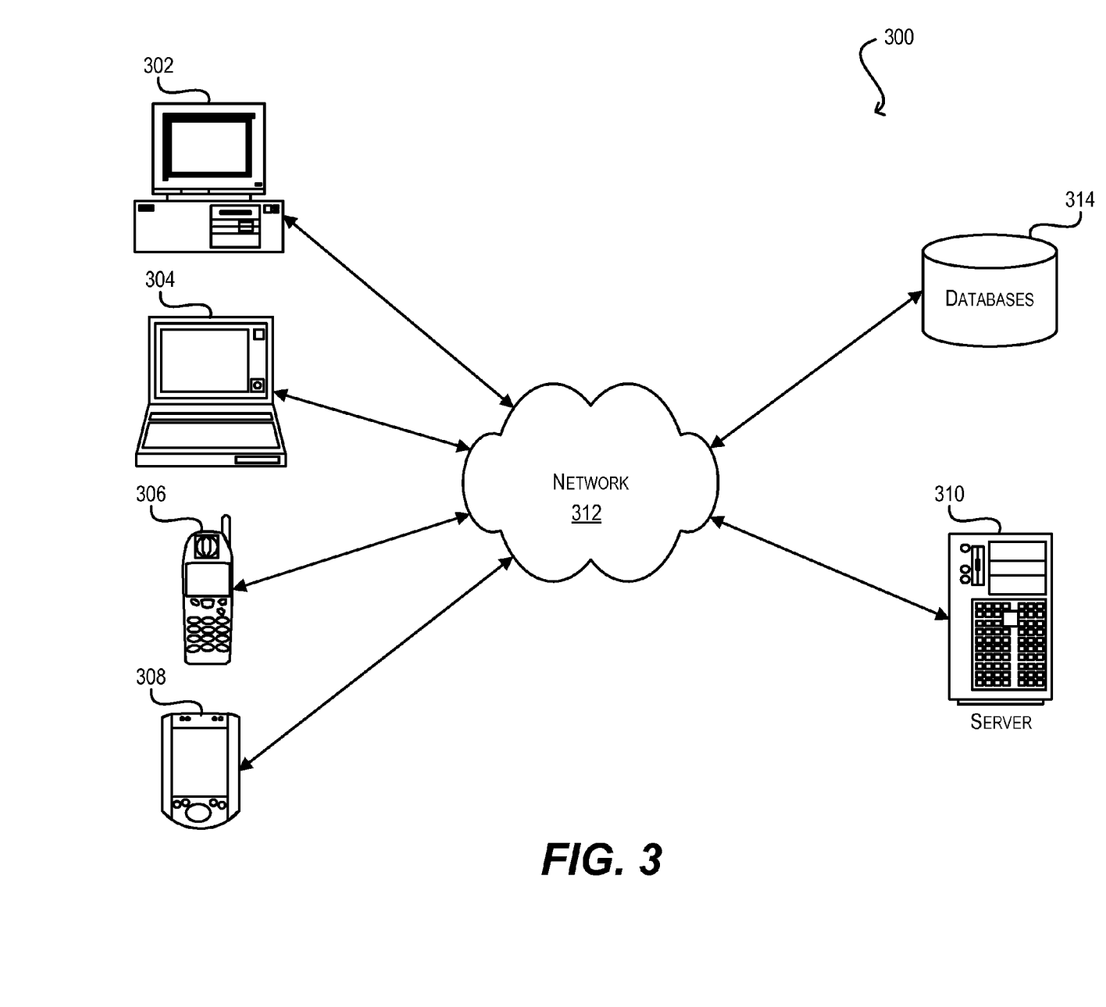
FIG. 3 is a simplified block diagram illustrating a system environment that may be used in accordance with an embodiment of the present invention.

FIG. 3 is a simplified block diagram illustrating a system environment 300 that may be used in accordance with an embodiment of the present invention. As shown, system environment 300 includes one or more client computing devices 302, 304, 306, 308 and a server 310. In one set of embodiments, client computing devices 302, 304, 306, 308 correspond to instances of client 202 of FIG. 2 and are configured to run a client-side component of a Web application, such as component 206. Further, server 310 corresponds to an instance of server 204 of FIG. 2 and is configured to run one or more server and/or middle-tier components of the Web application, such as components 208, 210, 212, 214. Although runtime system environment 300 is shown with four client computing devices and one server, any number of client computing devices and servers may be supported.

Client computing devices 302, 304, 306, 308 may be general purpose personal computers (including, e.g., personal computers and/or laptop computers running various versions of Microsoft Windows and/or Apple Macintosh operating systems), cell phones, smartphones, or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 302, 304, 306, 308 may be any other electronic device capable of communicating over a network (e.g., network 312 described below) with server 310.

Server 310 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server 310 may run an operating system including any of those discussed above, as well as any commercially available server operating system. Server 310 may also run any of a variety of server applications and/or mid-tier applications, including web servers, Java virtual machines, application servers, database servers, and the like. As indicated above, in one set of embodiments, server 310 is adapted to run one or more server and/or middle-tier components (such as servlet 208 of FIG. 2) that are configured to receive and service requests from client computing devices 302, 304, 306, 308.

As shown, client computing devices 302, 304, 306, 308 and server 310 are communicatively coupled via a network 312. Network 312 may be any type of network that can support data communications using any of a variety of commercially-available protocols, including without limitation TCP/IP, SNA, IPX, AppleTalk, and the like. Merely by way of example, network 314 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 300 may also include one or more databases 314. In one set of embodiments, database 314 corresponds to an instance of database 216 of FIG. 2, and is configured to store transactional data for a Web application running on server 310 and client computing devices 302, 304, 306, 308. Database 314 may also correspond to any other type of database or data storage component discussed in the present disclosure. Database 314 may reside in a variety of locations. By way of example, database 314 may reside on a storage medium local to (and/or resident in) one or more of the computers 302, 304, 306, 308, 310. Alternatively, database 314 may be remote from any or all of the computers 302, 304, 306, 308, 310 and/or in communication (e.g., via network 312) with one or more of these. In one set of embodiments, database 314 may reside in a storage-area network (SAN) familiar to those skilled in the art. Similarly, any necessary files for performing the functions attributed to the computers 302, 304, 306, 308, 310 may be stored locally on the respective computer and/or remotely on database 314, as appropriate. In one set of embodiments, database 314 is a relational database, such as Oracle 10g, that is adapted to store, update, and retrieve data in response to SQL-formatted commands.

Figure 4:
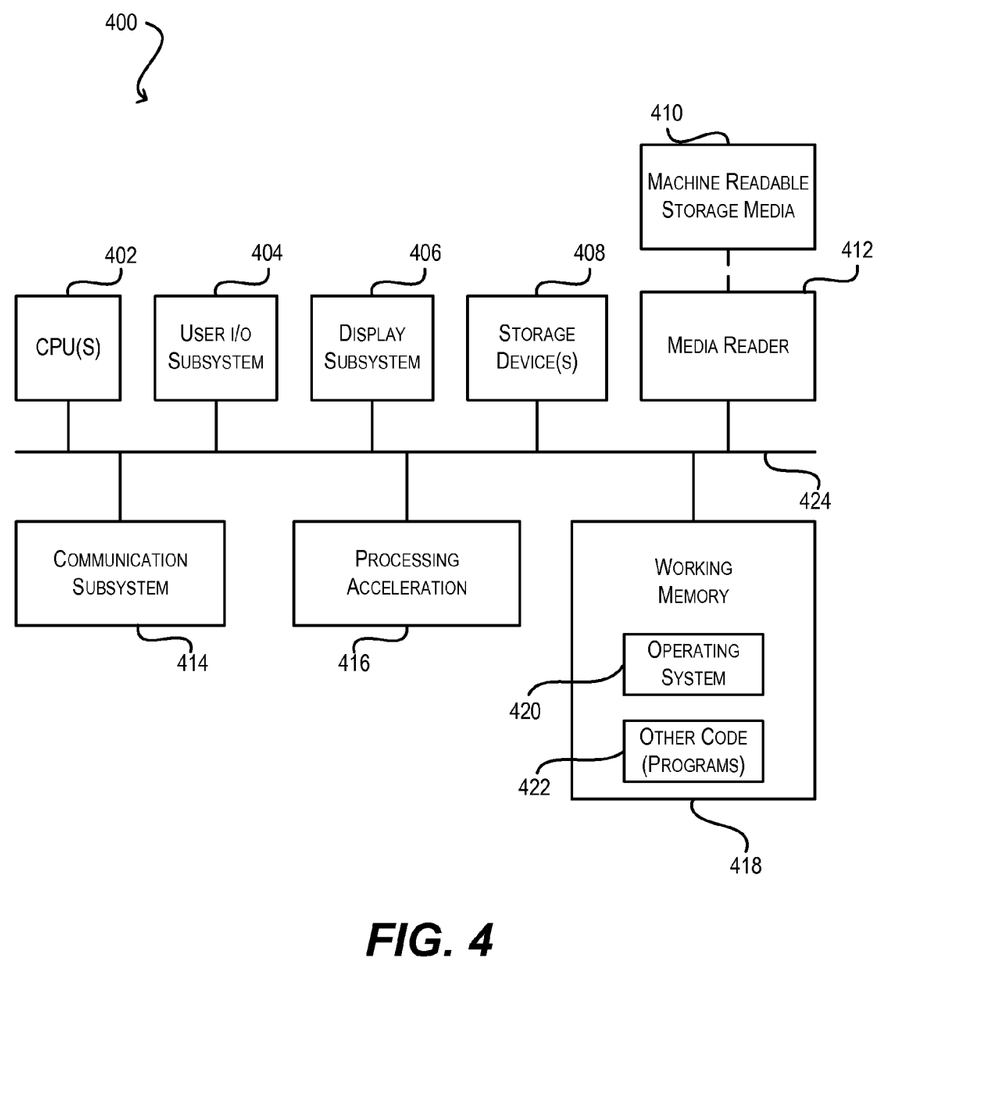
FIG. 4 is a simplified block diagram illustrating a computer system that may be used in accordance with an embodiment of the present invention.

FIG. 4 illustrates a computer system 400 that may be used in accordance with an embodiment of the present invention. In one set of embodiments, computer system 400 may be used to implement any of the computers 302, 304, 306, 308, 310 in system environment 300 described above. As shown, computer system 400 comprises hardware elements that may be electrically coupled via a bus 424. The hardware elements may include one or more central processing units (CPUs) 402, one or more input devices 404 (e.g., a mouse, a keyboard, etc.), and one or more output devices 406 (e.g., a display device, a printer, etc.). Computer system 400 may also include one or more storage devices 408. By way of example, the storage device(s) 408 may include devices such as magnetic disk drives, optical storage devices, and solid-state storage devices (e.g., random access memory (RAM), read-only memory (ROM), solid-state hard drives, etc.), which can be programmable, flash-updateable and/or the like.

Computer system 400 may additionally include a machine-readable storage media reader 412, a communications subsystem 414 (e.g., a modem, a network card (wireless or wired), an infra-red communication device, etc.), and working memory 418, which may include RAM and ROM devices as described above. In some embodiments, computer system 400 may also include a processing acceleration unit 416, which can include a digital signal processor (DSP), a special-purpose processor, and/or the like.

Machine-readable storage media reader 412 can further be connected to a machine-readable storage medium 410, together (and, optionally, in combination with storage device(s) 408) comprehensively representing remote, local, fixed, and/or removable storage devices/media for temporarily and/or more permanently containing machine-readable information. Communications system 414 may permit data to be exchanged with network 312 and/or any other computer described above with respect to system environment 300.

Computer system 400 may also comprise software elements, shown as being currently located within working memory 418, including an operating system 420 and/or other code 422, such as an application program (which may be a client application, Web browser, mid-tier application, RDBMS, etc.). It should be appreciated that alternative embodiments of computer system 400 may have numerous variations from that described above. For example, customized hardware might also be used and/or particular elements might be implemented in hardware, software, or both. Further, connection to other computing devices such as network input/output devices may be employed.

In one set of embodiments, the techniques described herein may be implemented as program code executable by a computer system (such as a computer system 400) and may be stored on machine-readable media. Machine-readable media may can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

While the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for securely invoking a server-side Application Programming Interface (API), the method comprising:
receiving, from a client-side component of a Web application, a request to invoke an API hosted on a server;
wherein the request is generated by a client device executing instructions written in a scripting language, the executed instructions displaying a visual presentation for a user on the client device; and asynchronously sending the request to invoke the API hosted on the server;
in response to receiving the request to invoke the API hosted on the server, invoking a security handler hosted on the server, the security handler configured to process the request in a manner that mitigates a plurality of different types of security attacks;
wherein the plurality of different types of security attacks includes at least replay attacks, and the security handler is configured to prevent a replay attack;
invoking the API on the server; and
sending a response comprising output data generated by the API to the client-side component;
wherein receipt of the response causes only a portion of the visual presentation corresponding to changed data to be updated without refreshing the entire display.

2. The method of claim 1, wherein the method is performed by a pluggable server extension running on the server.

3. The method of claim 1, wherein the instructions written in a scripting language run in a Web browser on the client device.

4. The method of claim 1, wherein the API is an API for an object oriented programming language.

5. The method of claim 1, wherein the plurality of security attacks further includes Cross Site Scripting, Cross Site Request Forgery, and injection attacks.

6. The method of claim 5, wherein the injection attacks include SQL injection, PL/SQL injection, XML injection, HTML injection, and scripting language injection.

7. The method of claim 5, wherein the plurality of different types of security attacks further includes illegal redirects and buffer overflows.

8. The method of claim 1, wherein the request includes an API name, a class name, and one or more parameter values for the API.

9. The method of claim 8, wherein processing the request comprises validating the one or more parameter values against a white-list of valid characters or values.

10. The method of claim 8, wherein processing the request comprises escaping code tags in the one or more parameter values.

11. The method of claim 8, wherein processing the request comprises determining whether the one or more parameter values are signed using a context signature.

12. The method of claim 1 further comprising:
invoking an authentication security handler configured to authenticate a user of the Web application that originated the request; and
invoking an authorization security handler configured to determine whether the user is authorized to invoke the API.

13. The method of claim 12, wherein the Web application is built using an application framework, and wherein the authentication and authorization security handlers rely on security data specific to the application framework.

14. The method of claim 1, wherein the API is configured to query one or more database tables, and wherein the results of the query are automatically filtered based on an identity of a user that originated the request and user-access permissions defined for the one or more database tables.

15. The method of claim 1, wherein the API is configured to store data into one or more database tables, and wherein the data is automatically encrypted prior to storage.

16. The method of claim 1, wherein a configuration file is maintained at the server including a list of server-side APIs and associated invocation permissions, and
determining, based on the list, whether the API can be invoked in response to the request.

17. A server system comprising:
a storage component configured to store code for an Application Programming Interface (API); and
a processing component in communication with the storage component, wherein the processing component is configured to:
receive, from a client-side component of a Web application, a request to invoke the API, wherein the request is generated by a client device executing instructions written in a scripting language, the executed instructions displaying a visual presentation for a user on the client device; and asynchronously sending the request to invoke the API hosted on the server;
in response to receiving the request to invoke the API hosted on the server, invoke a security handler configured to process the request in a manner that mitigates a plurality of different types of security attacks;
wherein the plurality of different types of security attacks includes at least replay attacks, and the security handler is configured to prevent a replay attack;
invoke the API; and
send a response comprising output data generated by the API to the client-side component;
wherein receipt of the response causes only a portion of the visual presentation corresponding to changed data to be updated without refreshing the entire display.

18. The server system of claim 17, wherein the plurality of different types of security attacks further includes Cross Site Scripting, Cross Site Request Forgery, and injection attacks.

19. The server system of claim 18, wherein the injection attacks include SQL injection, PL/SQL injection, XML injection, HTML injection, and scripting language injection.

20. A non-transitory machine-readable storage medium storing instructions which when executed cause one or more processors to securely invoke a server-side Application Programming Interface (API), the instructions comprising instructions for:
receiving, from a client-side component of a Web application, a request to invoke an API hosted on a server, wherein the request is generated by a client device executing instructions written in a scripting language, the executed instructions displaying a visual presentation for a user on the client device; and asynchronously sending the request to invoke the API hosted on the server;
in response to receiving the request to invoke the API hosted on the server, invoking a security handler hosted on the server, the security handler configured to process the request in a manner that mitigates a plurality of different types of security attacks;
wherein the plurality of different types of security attacks includes at least replay attacks, and the security handler is configured to prevent a replay attack;
invoking the API on the server; and
sending a response comprising output data generated by the API to the client-side component;
wherein receipt of the response causes only a portion of the visual presentation corresponding to changed data to be updated without refreshing the entire display.

21. The non-transitory machine-readable storage medium of claim 20, wherein the plurality of different types of security attacks further includes Cross Site Scripting, Cross Site Request Forgery, and injection attacks.

22. The non-transitory machine-readable storage medium of claim 21, wherein the injection attacks include SQL injection, PL/SQL injection, XML injection, HTML injection, and scripting language injection.

* * * * *

UNITED STATES PATENT AND TRADEMARK OFFICE
CERTIFICATE OF CORRECTION

| | |
|---|---|
| PATENT NO. | : 8,332,654 B2 |
| APPLICATION NO. | : 12/330008 |
| DATED | : December 11, 2012 |
| INVENTOR(S) | : Anbuselvan |

It is certified that error appears in the above-identified patent and that said Letters Patent is hereby corrected as shown below:

On Title page 2, Item (56) in column 2, under "Other Publications", line 4, delete "downloaded" and insert -- downloaded from --, therefor.

On Title page 2, Item (56) in column 2, under "Other Publications", line 6, delete "downloaded" and insert -- downloaded from --, therefor.

On Title page 3, Item (56) in column 1, under "Other Publications" line 20, delete "fac.html?" and insert -- faq.html? --, therefor.

Signed and Sealed this
Twelfth Day of March, 2013

Teresa Stanek Rea
*Acting Director of the United States Patent and Trademark Office*